United States Patent
Ji et al.

(10) Patent No.: US 10,815,689 B2
(45) Date of Patent: Oct. 27, 2020

(54) CANOPY

(71) Applicant: Zhejiang Yotrio Group Co., Ltd., Linhai (CN)

(72) Inventors: Kai Ji, Linhai (CN); Jianping Xie, Linhai (CN)

(73) Assignee: ZHEJIANG YOTRIO GROUP CO., LTD., Linhai (CN)

( * ) Notice: Subject to any disclaimer, the term of this patent is extended or adjusted under 35 U.S.C. 154(b) by 0 days.

(21) Appl. No.: 16/194,308

(22) Filed: Nov. 17, 2018

(65) Prior Publication Data
US 2019/0186167 A1    Jun. 20, 2019

(30) Foreign Application Priority Data

Dec. 20, 2017    (CN) .................... 2017 2 1796156 U

(51) Int. Cl.
| | | |
|---|---|---|
| *E04H 15/58* | (2006.01) | |
| *E06B 9/40* | (2006.01) | |
| *E04H 15/00* | (2006.01) | |
| *E04H 15/34* | (2006.01) | |
| *H02S 20/30* | (2014.01) | |
| *H02S 20/23* | (2014.01) | |
| *E04F 10/10* | (2006.01) | |

(52) U.S. Cl.
CPC ............. *E04H 15/58* (2013.01); *E04F 10/10* (2013.01); *E04H 15/008* (2013.01); *E04H 15/34* (2013.01); *E06B 9/40* (2013.01); *H02S 20/23* (2014.12); *H02S 20/30* (2014.12)

(58) Field of Classification Search
CPC ......... E04H 15/58; E04H 15/34; E04H 15/14;
      E04H 15/008; E04H 10/10; E04F 10/10;
      H02S 20/30; H02S 20/23; E04B 7/163
USPC .......... 135/87, 90, 94, 95–97, 156–157, 115,
      135/117, 119; 49/74.1, 91.1, 92.1, 118;
      160/32, 61, 370.23, 84.02, 84.08, 331;
      52/63, 66
See application file for complete search history.

(56) References Cited

U.S. PATENT DOCUMENTS

| | | | | |
|---|---|---|---|---|
| 4,527,355 A | * | 7/1985 | Numakami ............. | E04F 10/10 49/275 |
| 4,951,730 A | * | 8/1990 | Hsu ......................... | E06B 9/70 160/23.1 |
| 5,306,210 A | * | 4/1994 | Smit ....................... | E04B 7/163 454/250 |
| 5,579,820 A | * | 12/1996 | LePage ................... | E04H 6/04 160/268.1 |

(Continued)

*Primary Examiner* — Noah Chandler Hawk
(74) *Attorney, Agent, or Firm* — Schwegman Lundberg & Woessner, P.A.

(57) ABSTRACT

This invention provides a canopy, including a skeleton and at least one electric roller blind mechanism. Two sides of the electric roller blind mechanism have one guide rail, respectively, the guide rails are disposed at the skeleton, the electric roller blind mechanism includes a cloth drooping member capable of moving up and down, and two ends of the cloth drooping member slidably cooperate with corresponding two guide rails, respectively. In this invention, by providing the guide rails cooperating with the electric roller blind mechanism at the skeleton, the cloth drooping member can move up and down along the guide rails, such that the roller blind of the canopy can be opened or closed as needed, which is convenient compared to manual operation.

13 Claims, 8 Drawing Sheets

(56) References Cited

U.S. PATENT DOCUMENTS

| | | | | |
|---|---|---|---|---|
| 5,862,633 | A * | 1/1999 | Van Ells | E03B 3/02 |
| | | | | 52/16 |
| 5,964,271 | A * | 10/1999 | Lapointe | E06B 9/581 |
| | | | | 160/264 |
| 6,006,809 | A * | 12/1999 | Williams | E04F 10/02 |
| | | | | 160/46 |
| 8,413,389 | B2 * | 4/2013 | Frigerio | E04F 10/10 |
| | | | | 52/302.1 |
| 8,616,721 | B1 * | 12/2013 | Woodall, Jr. | F21V 33/006 |
| | | | | 135/88.11 |
| 9,422,715 | B1 * | 8/2016 | Selzer | E04F 10/08 |
| 9,428,955 | B2 * | 8/2016 | Fleischman | E06B 9/58 |
| 9,745,797 | B2 * | 8/2017 | Mullet | E06B 9/42 |
| 9,903,114 | B2 * | 2/2018 | Partridge | E04B 9/001 |
| 10,214,938 | B2 * | 2/2019 | Pan | E04H 15/54 |
| 10,273,750 | B2 * | 4/2019 | Fleischman | E06B 9/58 |
| 2011/0005560 | A1 * | 1/2011 | Nair | E04H 15/14 |
| | | | | 135/96 |
| 2012/0103377 | A1 * | 5/2012 | Sheridan | E04H 15/10 |
| | | | | 135/91 |
| 2013/0098564 | A1 * | 4/2013 | Jang | E06B 9/40 |
| | | | | 160/120 |
| 2013/0104460 | A1 * | 5/2013 | Pierson | B65G 57/06 |
| | | | | 49/86.1 |

* cited by examiner

CANOPY

CROSS-REFERENCE TO RELATED APPLICATIONS

This Non-provisional application claims priority under 35 U.S.C. § 119(a) on Chinese Patent Application No(s). 201721796156.0 on Dec. 20, 2017, the entire contents of which are hereby incorporated by reference.

BACKGROUND OF THE INVENTION

Field of the Invention

This invention relates to a technical field of leisure articles and, more particularly, to a canopy.

Description of the Related Art

At present, there are many kinds of canopies on the market. The canopies are divided into several kinds according to the type, size, material, and color, and different kinds of canopies are also used differently. The side of the existing canopy is usually a canopy cloth fixed at a support frame. The canopy cloth at the side is usually not able to be rolled up, and even if the canopy cloth can be rolled up, manual operation is required, and the process is cumbersome.

BRIEF SUMMARY OF THE INVENTION

Aiming at the above-mentioned problems, this invention provides a canopy with an electric roller blind.

The technical solution of this invention is as follows:

A canopy includes a skeleton and at least one electric roller blind mechanism. Two sides of the electric roller blind mechanism have one guide rail, respectively, the guide rails are disposed at the skeleton, the electric roller blind mechanism includes a cloth drooping member capable of moving up and down, and two ends of the cloth drooping member slidably cooperate with corresponding two guide rails, respectively.

By providing the guide rails cooperating with the electric roller blind mechanism at the skeleton, the cloth drooping member can move up and down along the guide rails, such that the roller blind of the canopy can be opened or closed as needed, which is convenient compared to manual operation.

In one embodiment of this invention, the electric roller blind mechanism may further include:

an outer cover pipe, being fixed relative to the skeleton, and a lower end of the outer cover pipe having a concave opening;

a transmission pipe, disposed in the outer cover pipe;

a roller blind cloth, one end being wound at the transmission pipe and connected with the transmission pipe, and the other end being connected with the cloth drooping member through the concave opening; and a roller blind motor, configured to drive the transmission pipe to rotate and control the roller blind cloth to move up and down.

The working principle of the electric roller blind mechanism is: the roller blind motor works, such that the transmission pipe rotates in the outer cover pipe, thereby unwinding or rolling the roller blind. By disposing guide rails, the cloth drooping member only slides on the guide rails, and the cloth drooping member does not swing backwards and forwards due to wind blowing.

In one embodiment of this invention, one end of a body of the roller blind motor may be fixed relative to the outer cover pipe, and the other end may reach into the transmission pipe. A rotation wheel may be installed at an output shaft of the roller blind motor, the body of the roller blind motor may be in clearance fit with the transmission pipe, and the rotation wheel may be fixed relative to an inner side wall of the transmission pipe in a circumferential direction.

In this invention, the rotation wheel being fixed relative to the inner side wall of the transmission pipe in the circumferential direction refers that the inner side wall of the transmission pipe is not round, and the rotation wheel is adapted to the inner side wall of the transmission pipe so as to achieve synchronous rotation.

In one embodiment of this invention, a cross section of the inner side wall of the transmission pipe may be regular polygonal, and a cross section of an outer side wall of the rotation wheel may be adapted to the cross section of the inner side wall of the transmission pipe.

The structure of the regular polygon is easy to process and stress is better during working.

In one embodiment of this invention, the skeleton may include at least two support rods parallel to each other and a top frame installed at upper ends of the support rods, the electric roller blind mechanism may be disposed between two mutually parallel support rods or at one side of the top frame, and the guide rails may be disposed at the support rods or upper ends of the guide rails are fixed with the top frame. When the guide rails are disposed at the support rods, the guide rails may be grooves disposed at the support rods or roller blind guide pipes fixed at the support rods; and when upper ends of the guide rails are fixed with the top frame, the guide rails may be roller blind guide pipes.

In one embodiment of this invention, an upper portion of the outer cover pipe may be fixed with the top frame.

In one embodiment of this invention, the canopy may further include a solar panel installed at the top frame, a controller electrically connected with the solar panel, and a battery electrically connected with the controller, and the controller is electrically connected with the roller blind motor.

In outdoors without alternating current, the canopy of this invention can charge the battery by disposing the solar panel, such that the battery can supply power to the electric control mechanism.

In one embodiment of this invention, an electrical device may be further installed at the support rods or the top frame, and the controller may be electrically connected with the electrical device.

The electric device can be at least one of a lamp and a speaker. The lamp can also be a festive lantern and can be other devices in actual use.

In one embodiment of this invention, the electric roller blind mechanism may further include a tail insertion, a first end cover and a second end cover installed at two ends of the outer cover pipe. The first end cover may be fixed at the outer cover pipe, one end of a body of the roller blind motor may be fixed with the first end cover, the tail insertion may be installed at one end of the transmission pipe away from the roller blind motor, and the tail insertion may cooperate with the second end cover.

In actual use, the tail insertion can be rotated in cooperation with the second end cover. Alternatively, the tail insertion is fixed with the second end cover, and the tail insertion is rotated in cooperation with the transmission pipe.

Beneficial effects of this invention are: by providing the guide rails cooperating with the electric roller blind mechanism at the skeleton, the cloth drooping member can move up and down along the guide rails, such that the roller blind of the canopy can be opened or closed as needed, which is convenient compared to manual operation.

Figure 1:
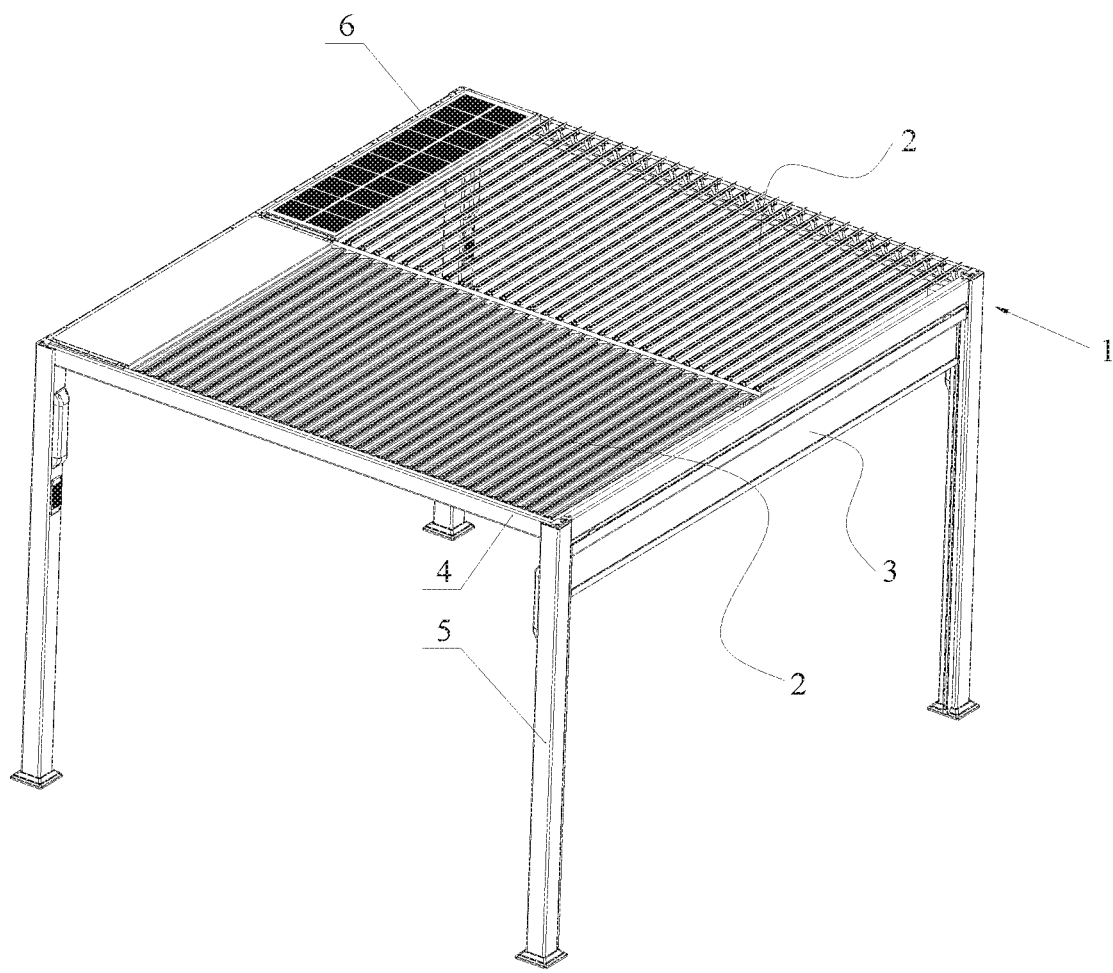
FIG. 1 is a structural schematic diagram of a canopy in this invention.

FIGURE REFERENCE NUMERALS 1 skeleton; 2 window shades; 3 electric roller blind mechanism; 4 top frame; 5 support rod; 6 solar panel; 7 battery; 8 linear actuator; 9 slat; 10 first fixation member; 11 linkage strip; 12 first connection member; 13 lamp; 14 speaker; 15 guide rail; 16 cloth drooping member; 17 second hook portion; 18 limiting portion; 19 positioning slot; 20 inserting slot portion; 21 trigger portion; 22 protrusion strip; 23 insertion portion; 24 first hook portion; 25 outer cover pipe; 26 concave opening; 27 first end cover; 28 rotation wheel; 29 second end cover; 30 tail insertion; 31 roller blind cloth; 32 transmission pipe; 33 roller blind motor; and 34 second fixation member.

DETAILED DESCRIPTION OF THE INVENTION

This invention will be described in detail below in combination with the accompanying drawings.

Figure 4:
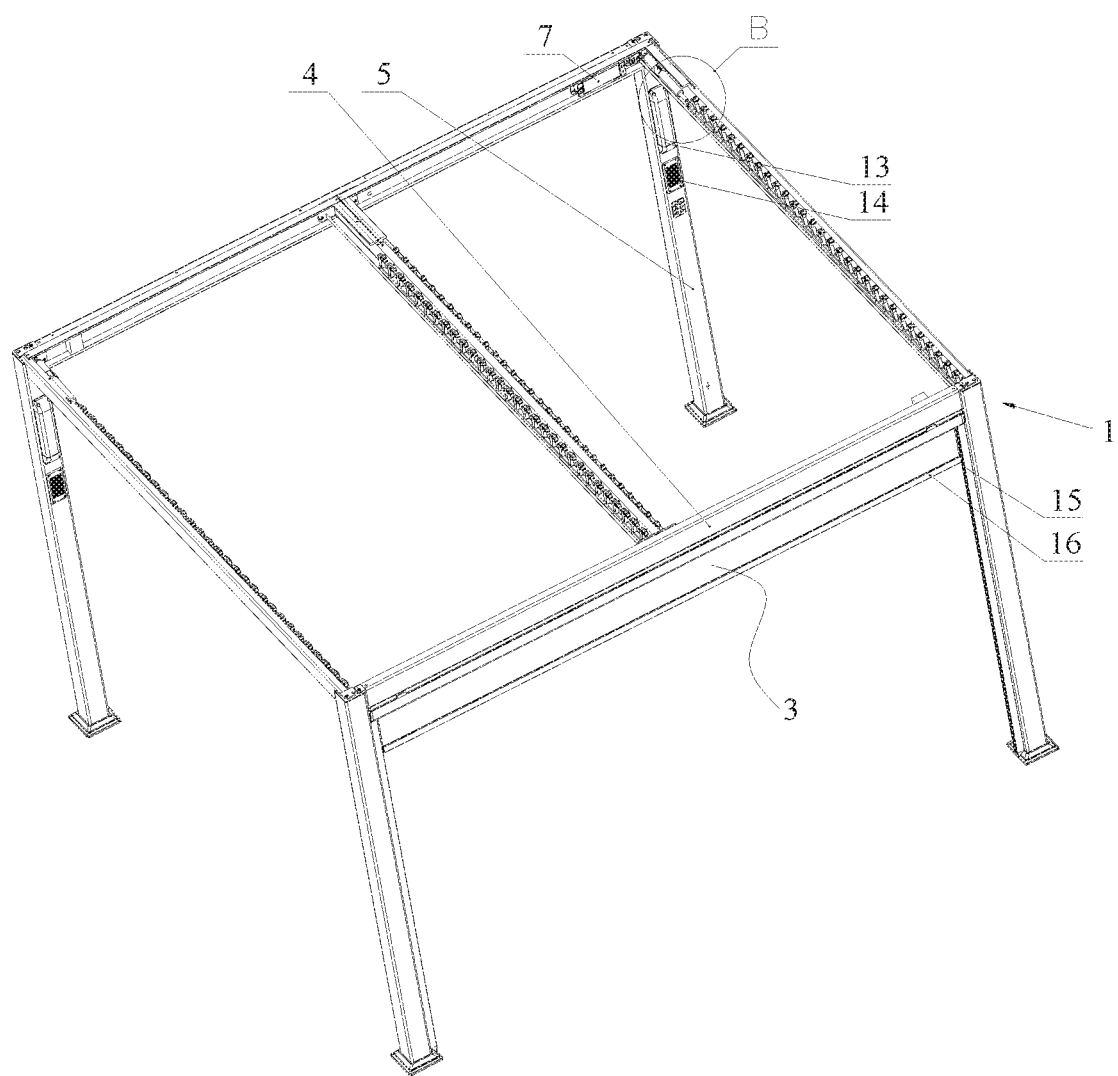
FIG. 4 is a schematic diagram of the canopy in this invention after slats are removed.

As shown in FIG. 1 and FIG. 4, a canopy includes a skeleton 1, and the skeleton 1 includes at least two support rods 5 parallel to each other. The canopy further includes at least one electric roller blind mechanism 3, and the electric roller blind mechanism 3 is disposed between two mutually parallel support rods 5. The electric roller blind mechanism 3 is disposed between two mutually parallel support rods 5 of the canopy, such that at least one side of the canopy can be opened or closed as needed, which is convenient compared to manual operation.

Figure 9:
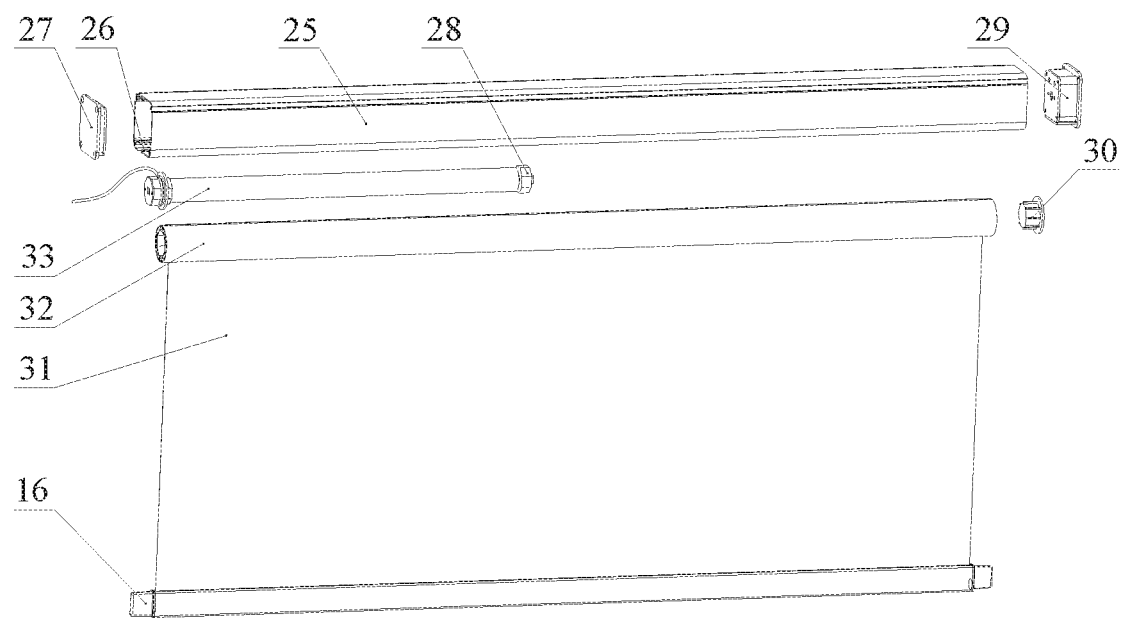
FIG. 9 is an exploded view of an electric roller blind mechanism.

As shown in FIG. 4 and FIG. 9, in this embodiment, two support rods 5 cooperating with the electric roller blind mechanism 3 have one guide rail 15, respectively, and the electric roller blind mechanism 3 includes:

an outer cover pipe 25, being fixed relative to the skeleton 1, and the lower end of the outer cover pipe 25 having a concave opening 26;

a transmission pipe 32, disposed in the outer cover pipe 25;

a cloth drooping member 16, two ends slidably cooperate with guide rails 15 of two support rods 5, respectively;

a roller blind cloth 31, one end being wound at the transmission pipe 32 and connected with the transmission pipe 32, and the other end being connected with the cloth drooping member 16 through the concave opening 26; and a roller blind motor 33, configured to drive the transmission pipe 32 to rotate and control the roller blind cloth 31 to move up and down.

The working principle of the electric roller blind mechanism 3 is: the roller blind motor 33 works, such that the transmission pipe 32 rotates in the outer cover pipe 25, thereby unwinding or rolling the roller blind. By disposing guide rails 15, the cloth drooping member 16 only slides on the guide rails 15, and the cloth drooping member 16 does not swing backwards and forwards due to wind blowing.

As shown in FIG. 9, one end of a body of the roller blind motor 33 is fixed relative to the outer cover pipe 25, and the other end reaches into the transmission pipe 32. An output shaft of the roller blind motor 33 is provided with a rotation wheel 28, the body of the roller blind motor 33 is in clearance fit with the transmission pipe 32, and the rotation wheel 28 is fixed relative to an inner side wall of the transmission pipe 32 in a circumferential direction. In this invention, the rotation wheel 28 being fixed relative to the inner side wall of the transmission pipe 32 in the circumferential direction refers that the inner side wall of the transmission pipe 32 is not round, and the rotation wheel 28 is adapted to the inner side wall of the transmission pipe 32 so as to achieve synchronous rotation.

As shown in FIG. 9, in this embodiment, the cross section of the inner side wall of the transmission pipe 32 is regular polygonal, and the cross section of an outer side wall of the rotation wheel 28 is adapted to the cross section of the inner side wall of the transmission pipe 32. The structure of the regular polygon is easy to process and stress is better during working.

As shown in FIG. 4, in this embodiment, the guide rails 15 are roller blind guide pipes fixed at the support rods 5. In actual use, the guide rails 15 are grooves disposed at the support rods 5.

As shown in FIG. 9, in this embodiment, the electric roller blind mechanism 3 further includes a tail insertion 30, a first end cover 27 and a second end cover 29 installed at two ends of the outer cover pipe 25. Both the first end cover 27 and the second end cover 29 are fixed relative to the outer cover pipe 25 in the circumferential direction. The first end cover 27 is fixed at the outer cover pipe 25, one end of the body of the roller blind motor 33 is fixed with the first end cover 27, the tail insertion 30 is installed at one end of the transmission pipe 32 away from the roller blind motor 33, and the tail insertion 30 cooperates with the second end cover 29. In actual use, the tail insertion 30 can be rotated in cooperation with the second end cover 29. Alternatively, the tail insertion 30 is fixed with the second end cover 29, and the tail insertion 30 is rotated in cooperation with the transmission pipe 32.

As shown in FIG. 4, in this embodiment, the skeleton 1 further includes a top frame installed at the upper end of the support rods 5, and the upper portion of the outer cover pipe 25 is fixed with the top frame 4.

As shown in FIG. 1, in this embodiment, the canopy further includes a solar panel 6 installed at the top frame 4, a controller electrically connected with the solar panel 6, and a battery 7 electrically connected with the controller. The controller is electrically connected with the roller blind motor 33.

In other embodiments, the electric roller blind mechanism can also be disposed at one side of the top frame (specifically, the top frame may include a top beam, and the electric roller blind mechanism may be disposed at one side of the top beam). At this time, the guide rails can be not disposed at the support rods, the upper ends of the guide rails are fixed with the top frame, and the two ends of the cloth drooping member slidably cooperate with corresponding two guide rails at two sides, respectively. Preferably, at this time, the guide rails are roller blind guide pipes.

As shown in FIG. 1, FIG. 2, FIG. 3, FIG. 4 and FIG. 5, the canopy in this embodiment further includes an electric window shade top structure, and the electric window shade top structure includes the top frame 4. At least one group of window shades 2 is installed at the top frame 4, and each group of window shades 2 includes a plurality of slats 9, a linkage strip 11, and an electric control mechanism. Each slat 9 is rotatably installed at the top frame 4, each slat 9 is directly hinge jointed in cooperation with the linkage strip 11 or hinge jointed in cooperation with the linkage strip 11 through a fixation member fixed at the slat, and the electric control mechanism is used to drive at least one linkage strip 11 to move which controls opening and closing of the slats 9.

In actual use, when there are a plurality groups of window shades 2, different groups of window shades 2 can share the electric control mechanism or do not share the electric control mechanism. When the electric control mechanism is not shared, the window shades 2 in different areas can be controlled according to requirements. The opening and closing angles of different groups of window shades 2 can be different. This invention can drive the linkage strip 11 to move through the electric control mechanism, thereby controlling the opening and closing of slats 9 corresponding to window shades 2, and operation is convenient and reliable compared with the operation mode of rolling a rolling rod in the prior art.

Figure 3:
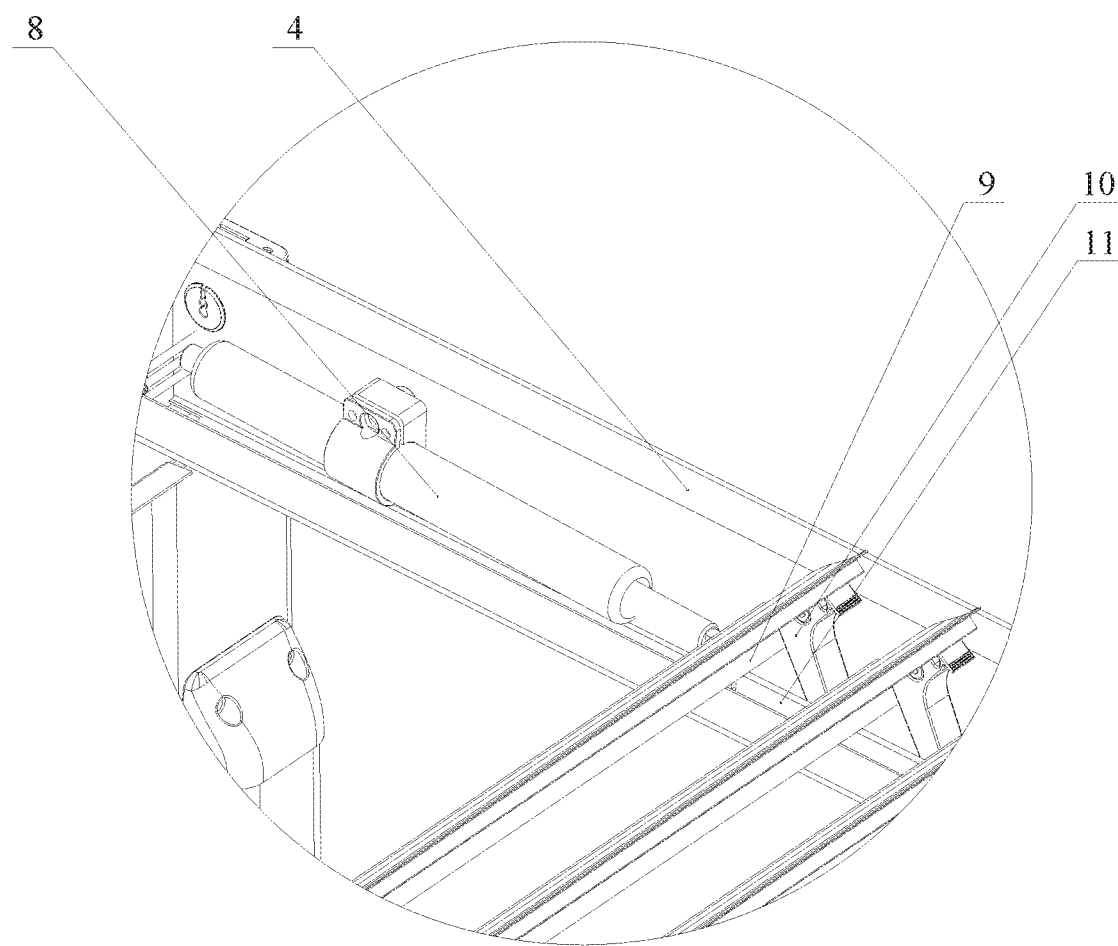
FIG. 3 is an enlarged view of A in FIG. 2.
Figure 5:
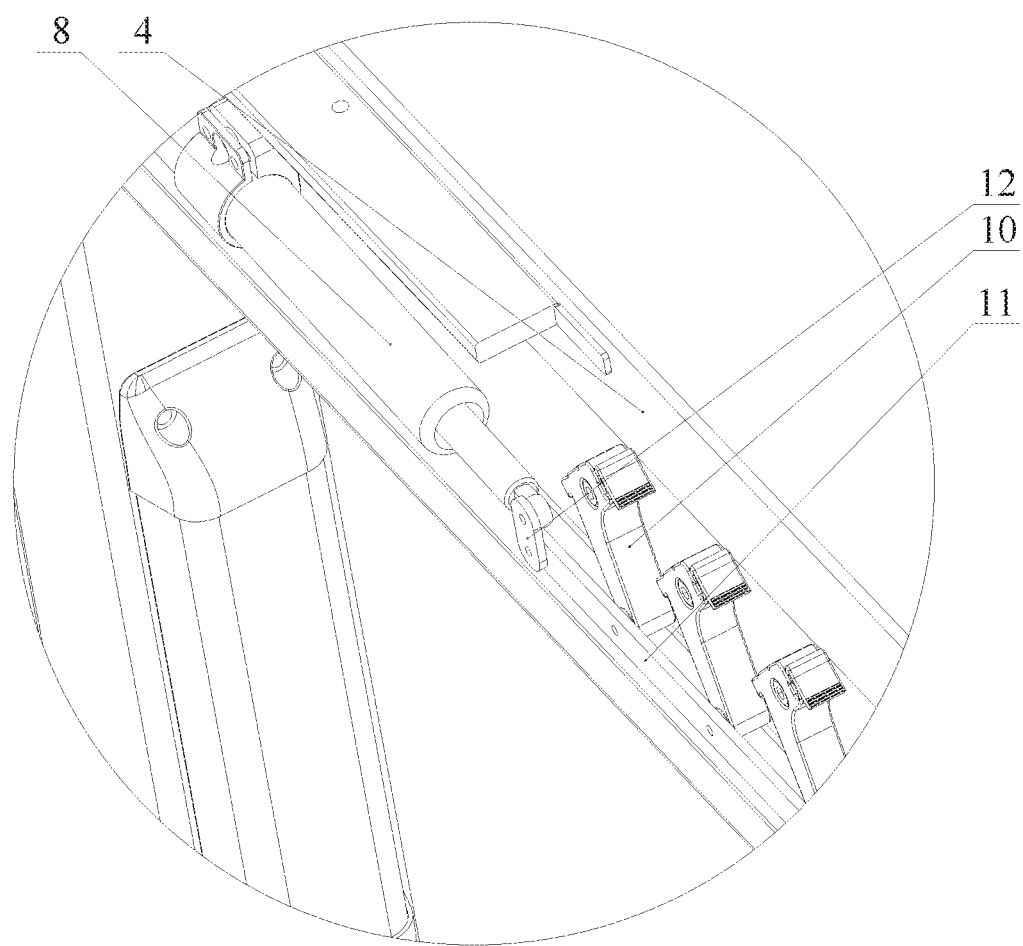
FIG. 5 is an enlarged view of B in FIG. 4.

As shown in FIG. 3 and FIG. 5, in this embodiment, the electric control mechanism includes a linear actuator 8 and a first connection member 12. One end of the first connection member 12 is hinge jointed in cooperation with a movable rod of the linear actuator 8, and the other end is hinge jointed in cooperation with the linkage strip 11. In actual use, the electric control mechanism may include a drive motor, a second connection member, and a third connection member. A first end of the second connection member is fixed with an output shaft of the drive motor, a second end of the second connection member is hinge jointed in cooperation with a first end of the third connection member, and a second end of the third connection member is hinge jointed in cooperation with the linkage strip 11.

As shown in FIG. 1, in this embodiment, two groups of window shades 2 are installed at the top frame 4, and more groups of window shades 2 can be installed in actual use.

Figure 2:
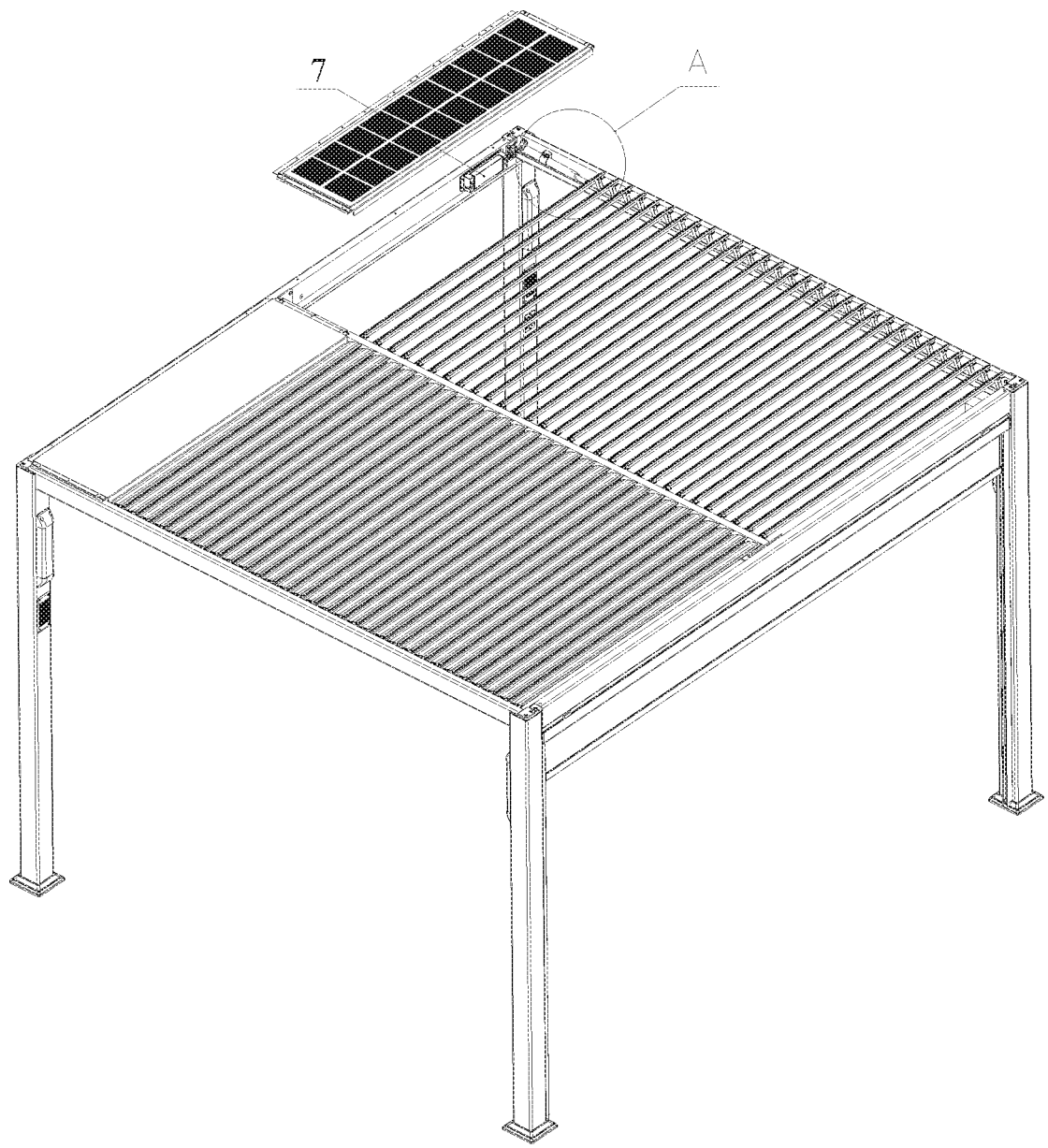
FIG. 2 is a schematic diagram of the canopy in this invention after explosion of a solar panel.

As shown in FIG. 1 and FIG. 2, in this embodiment, the canopy further includes the solar panel 6 installed at the top frame 4, the controller electrically connected with the solar panel 6, and the battery 7 electrically connected with the controller. The controller is electrically connected with the electric control mechanism. In outdoors without alternating current, the canopy of this invention can charge the battery 7 by disposing the solar panel 6, such that the battery 7 can supply power to the electric control mechanism.

Figure 7:
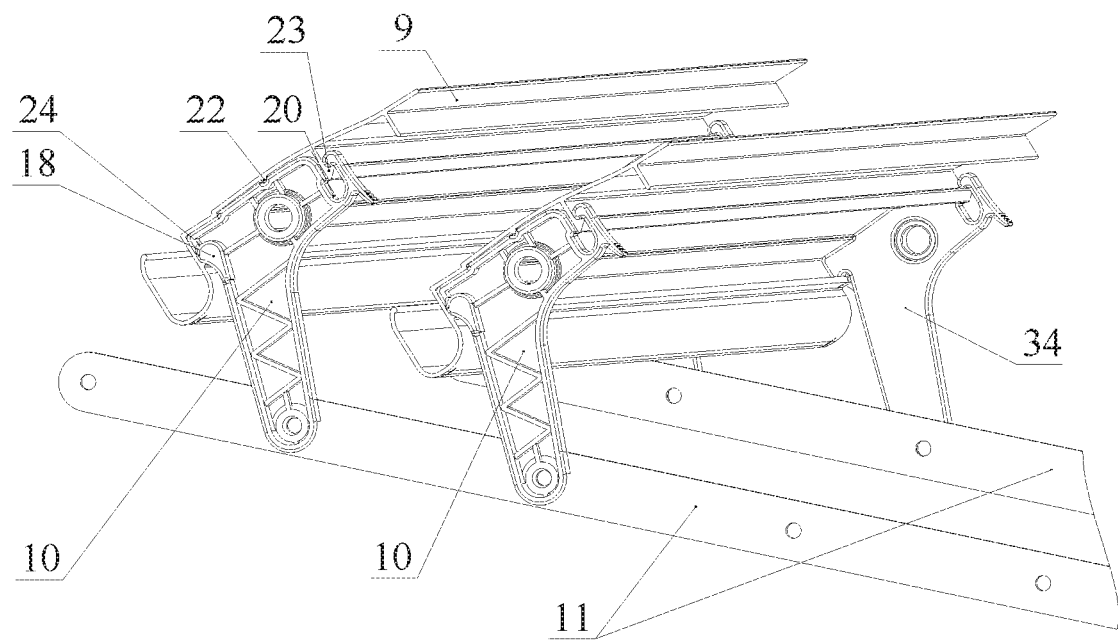
FIG. 7 is a schematic diagram of cooperation of slats, fixation members, and linkage strips.
Figure 8:
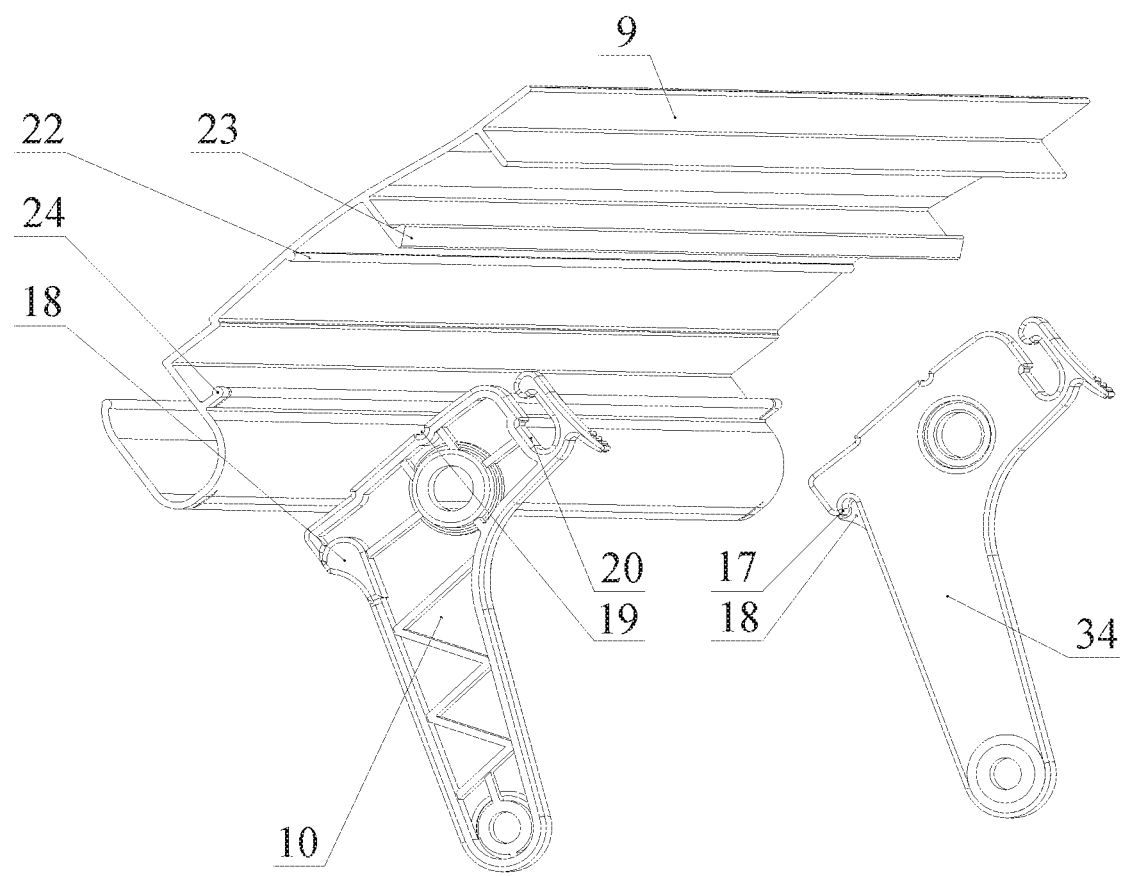
FIG. 8 is an exploded view of the slat and the fixation members.

As shown in FIG. 7 and FIG. 8, in this embodiment, slats 9 are hinge jointed in cooperation with linkage strips 11 through fixation members fixed with the slats 9. The first fixation members 10 are installed at one end of the slats 9, the second fixation members 34 are fixed at the other end of the slats 9, and both the first fixation members 10 and the second fixation members 34 are installed at the top frame. Each first fixation member 10 is hinge jointed in cooperation with the linkage strip 11, and each second fixation member 34 is hinge jointed in cooperation with the other linkage strip 11. The slats 9 are usually section steel, and the direct rotated cooperation between the section steel and the top frame 4 is not easy to realize. By providing fixation members at both ends of the slats 9, the slats 9 can be conveniently installed at the top frame 4.

Figure 6:
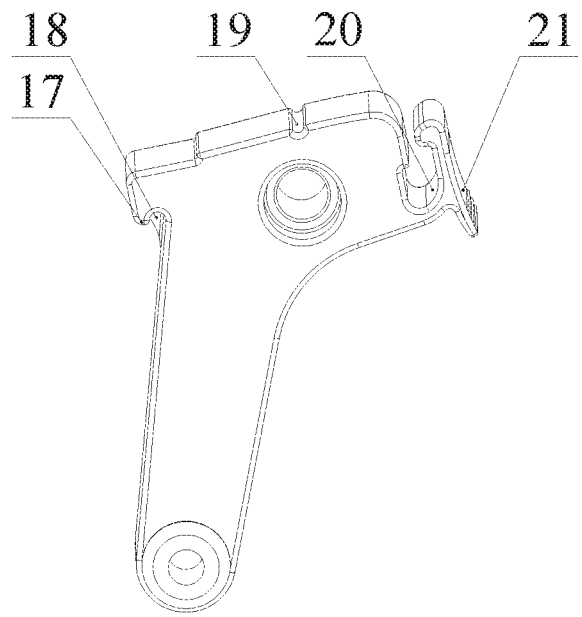
FIG. 6 is a structural schematic diagram of a first fixation member.

As shown in FIG. 6, FIG. 7, and FIG. 8, in this embodiment, one side of the slat 9 has a first hook portion 24 in a width direction, and a middle portion of the slat 9 has an insertion portion 23 in the width direction. The first fixation member 10 and the second fixation member 34 are identical in structure, and one end of the first fixation member 10 cooperating with the slat 9 has a second hook portion 17 cooperating with the first hook portion 2 and an inserting slot portion 20 cooperating with the insertion portion 23. When the first hook portion 24 is connected with the second hook portion 17, the insertion portion 23 is inserted into the inserting slot portion 20. In actual use, the surface of the outer wall of one of the slot walls of the inserting slot portion 20 is provided with a trigger portion 21, and the trigger portion 21 is triggered to loosen the first hook portion 24 disposed at the slat 9 and the second hook portion 17 disposed at the fixation member. The first hook portion 24 and the second hook portion 17 are separated thereby easily completing the disassembly of the slat 9.

As shown in FIG. 6, FIG. 7, and FIG. 8, in this embodiment, the first fixation member 10 further has a positioning slot 19, the positioning slot 19 is located between the second hook portion 17 and the inserting slot portion 20, and the slat further has a protrusion strip 22 cooperating with the positioning slot 19. The positioning slot 19 cooperates with the protrusion strip 22, facilitating the positioning of the fixation members and the slates 9, which not only improves the assembly efficiency, but also improves the transmission effect of the fixation members and the slates.

As shown in FIG. 6, FIG. 7, and FIG. 8, in this embodiment, both the first fixation members 10 and the second fixation members 34 are installed at ends of the slats 9. The first fixation member 10 and the second fixation member 34 have limiting portions 18 relative to the outer side end of the slat 9, the position of the limiting portion 18 corresponds to the position of the second hook portion 17 or the position of the inserting slot portion 20, and the limiting portion 18 is used for abutting against the end of the slat 9. By providing the limiting portion 18 at the outer side end, the positions of the fixation members can be limited, and the assembly precision and assembly efficiency can be improved.

In this embodiment, the electric control mechanism can be installed at the top frame 4. In actual use, the electric control mechanism can also be installed at the support rod 5. In this embodiment, an electrical device is also installed at the support rod 5 or the top frame 4, and the controller is electrically connected with the electrical device. The electric device can be at least one of a lamp 13 and a speaker 14. The lamp 13 can also be a festive lantern and can be other devices in actual use.

The above-mentioned is only a preferred embodiment of this invention and thus does not limit the protection scope of this invention. Any equivalent structural transformation made by using the description and the contents of the drawings of this invention directly or indirectly applied to other related technical field is equally included in the protection scope of this invention.

What is claimed is:

1. A canopy, comprising a skeleton and at least one electric roller blind mechanism, wherein the skeleton comprises a top frame and at least two support rods parallel to each other; wherein two sides of the electric roller blind mechanism are provided with one guide rail, respectively, the guide rails are disposed at the support rods, the electric roller blind mechanism comprises a cloth drooping member capable of moving up and down, and two ends of the cloth drooping member slidably cooperate with corresponding two guide rails, respectively;

wherein the canopy further comprises an electric window shade top structure, and the electric window shade top structure comprises the top frame, the top frame installed at upper ends of the support rods; at least one group of window shades is installed at the top frame, and each group of window shades comprises a plurality of slats, a linkage strip, and an electric control mechanism; each slat is rotatably installed at the top frame, each slat is directly hinge jointed in cooperation with the linkage strip or hinge jointed in cooperation with the linkage strip through a fixation member fixed at the slat, and the electric control mechanism is used to drive at least one linkage strip to move which controls opening and closing of the slats;

wherein the electric control mechanism comprise a linear actuator and a first connection member; a first end of the first connection member is hinge jointed in cooperation with a movable rod of the linear actuator, and a second end of the first connection member is hinge jointed in cooperation with the linkage strip;

wherein the slats are hinge jointed in cooperation with linkage strips through fixation members fixed with the slats; a plurality of first fixation members are installed at a first end of the slats, a plurality of second fixation members are fixed at a second end of the slats, and both the first fixation members and the second fixation members are installed at the top frame; each first fixation member is hinge jointed in cooperation with the linkage strip, and each second fixation member is hinge jointed in cooperation with the other linkage strip.

2. The canopy according to claim 1, the electric roller blind mechanism further comprising:

an outer cover pipe, fixed relative to the skeleton, and a lower end of the outer cover pipe having a concave opening;

a transmission pipe, disposed in the outer cover pipe;

a roller blind cloth, one end being wound at the transmission pipe and connected with the transmission pipe, and the other end being connected with the cloth drooping member through the concave opening; and a roller blind motor, configured to drive the transmission pipe to rotate and control the roller blind cloth to move up and down.

3. The canopy according to claim 2, wherein one end of a body of the roller blind motor is fixed relative to the outer cover pipe, the other end reaches into the transmission pipe, a rotation wheel is installed at an output shaft of the roller blind motor, the body of the roller blind motor is in clearance fit with the transmission pipe, and the rotation wheel is fixed relative to an inner side wall of the transmission pipe in a circumferential direction.

4. The canopy according to claim 3, wherein a cross section of the inner side wall of the transmission pipe is regular polygonal, and a cross section of an outer side wall of the rotation wheel is adapted to the cross section of the inner side wall of the transmission pipe.

5. The canopy according to claim 2, wherein the electric roller blind mechanism is disposed between two mutually parallel support rods or at one side of the top frame.

6. The canopy according to claim 5, when the guide rails are disposed at the support rods, the guide rails are grooves disposed at the support rods or roller blind guide pipes fixed at the support rods; and when upper ends of the guide rails are fixed with the top frame, the guide rails are roller blind guide pipes.

7. The canopy according to claim 5, wherein an upper portion of the outer cover pipe is fixed with the top frame.

8. The canopy according to claim 7, wherein further comprising a solar panel installed at the top frame, a controller electrically connected with the solar panel, and a battery electrically connected with the controller, and the controller is electrically connected with the roller blind motor.

9. The canopy according to claim 8, wherein an electrical device is further installed at the support rods or the top frame, and the controller is electrically connected with the electrical device.

10. The canopy according to claim 2, wherein the electric roller blind mechanism further comprises a tail insertion, a first end cover and a second end cover installed at two ends of the outer cover pipe, the first end cover is fixed at the outer cover pipe, one end of a body of the roller blind motor is fixed with the first end cover, the tail insertion is installed at one end of the transmission pipe away from the roller blind motor, and the tail insertion cooperates with the second end cover.

11. The canopy according to claim 1, wherein one side of the slat has a first hook portion in a width direction, and a middle portion of the slat has an insertion portion in the width direction, the first fixation members and the second fixation members are identical in structure, and one end of the first fixation members cooperating with the slat has a second hook portion cooperating with the first hook portion and an inserting slot portion cooperating with the insertion portion.

12. The canopy according to claim 11, wherein each first fixation member further has a positioning slot, the positioning slot is located between the second hook portion and the inserting slot portion, and the slat further has a protrusion strip cooperating with the positioning slot, the positioning slot cooperates with the protrusion strip.

13. The canopy according to claim 12, wherein both the first fixation members and the second fixation members are installed at ends of the slats; each first fixation member and each second fixation member have limiting portions relative to an outer side end of the slat, the position of the limiting portion corresponds to the position of the second hook portion or the position of the inserting slot portion, and the limiting portion is used for abutting against the end of the slat.

* * * * *